(12) United States Patent
Narayanan et al.

(10) Patent No.: US 10,958,423 B2
(45) Date of Patent: Mar. 23, 2021

(54) AUTOMATED CHANGEOVER OF TRANSFER ENCRYPTION KEY

(71) Applicant: Microsoft Technology Licensing, LLC, Redmond, WA (US)

(72) Inventors: Venkatesh Narayanan, Bangladore (IN); Anoob Backer Mundapillythottathil Aboo Backer, Kerala (IN); Soumya Desai, Bangladore (IN); Akshay N V, Bengaluru (IN); Nagalinga Raju Samuthirapandi, Woodinville, WA (US); Soumya Jain, Uttar Pradesh (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 470 days.

(21) Appl. No.: 15/890,148

(22) Filed: Feb. 6, 2018

(65) Prior Publication Data

US 2019/0245683 A1   Aug. 8, 2019

(51) Int. Cl.
*H04L 29/06* (2006.01)
*H04L 9/08* (2006.01)

(52) U.S. Cl.
CPC ........ *H04L 9/0825* (2013.01); *H04L 63/0442* (2013.01); *H04L 63/061* (2013.01); *H04L 63/068* (2013.01); *H04L 2463/062* (2013.01)

(58) Field of Classification Search
CPC . H04L 9/0825; H04L 63/068; H04L 63/0442; H04L 63/061; H04L 2463/062
See application file for complete search history.

(56) References Cited

U.S. PATENT DOCUMENTS 6,049,878 A * 4/2000 Caronni ................ H04L 9/0836
380/277
8,793,491 B2 * 7/2014 Dancer ................ H04L 63/065
713/168

(Continued)

FOREIGN PATENT DOCUMENTS

WO         0225861 A1    3/2002

OTHER PUBLICATIONS

"International Search Report and Written Opinion Issued in PCT Application No. PCT/US19/014851", dated Mar. 26, 2019, 10 Pages.

*Primary Examiner* — Samson B Lemma
*Assistant Examiner* — Abdullah Almamun
(74) *Attorney, Agent, or Firm* — Workman Nydegger

(57) ABSTRACT

The automated changeover of a transfer encryption key from one transfer encryption key to another. This occurs in an environment in which a set of computing systems are to share one or more keys (such as a private and public key pair). The transfer encryption key is used to encrypt communications of the key(s) such that the encrypted key(s) may be transferred over a transfer system without the transfer system having access to the key(s). In order to perform automated changeover of the transfer encryption key, one of the set of computing systems encrypts the next transfer encryption key with the prior transfer encryption key. The transfer system provides this encrypted message to the remainder of the set of computing systems, which may then decrypt the encrypted message using the prior transfer encryption key, to find the next transfer encryption key.

20 Claims, 14 Drawing Sheets

(56) References Cited

U.S. PATENT DOCUMENTS

| | | | |
|---|---|---|---|
| 8,903,094 B2 * | 12/2014 | Bovino | H04L 9/0852 380/278 |
| 9,832,183 B2 * | 11/2017 | Ganesan | G06F 21/31 |
| 2002/0129261 A1 * | 9/2002 | Cromer | G06Q 20/40975 713/193 |
| 2004/0025021 A1 * | 2/2004 | Aikawa | G06Q 20/06 713/172 |
| 2010/0031021 A1 | 2/2010 | Arnold et al. | |
| 2011/0026714 A1 * | 2/2011 | Thomas | G06F 21/57 380/278 |
| 2013/0163762 A1 * | 6/2013 | Zhang | H04L 63/0853 380/270 |
| 2013/0191648 A1 * | 7/2013 | Bursell | G06F 21/6218 713/189 |
| 2014/0071484 A1 * | 3/2014 | Ishii | G06F 3/1296 358/1.15 |
| 2015/0200920 A1 * | 7/2015 | Norton | H04L 63/0471 713/153 |
| 2015/0363775 A1 * | 12/2015 | Li | G06Q 20/3829 705/71 |

* cited by examiner

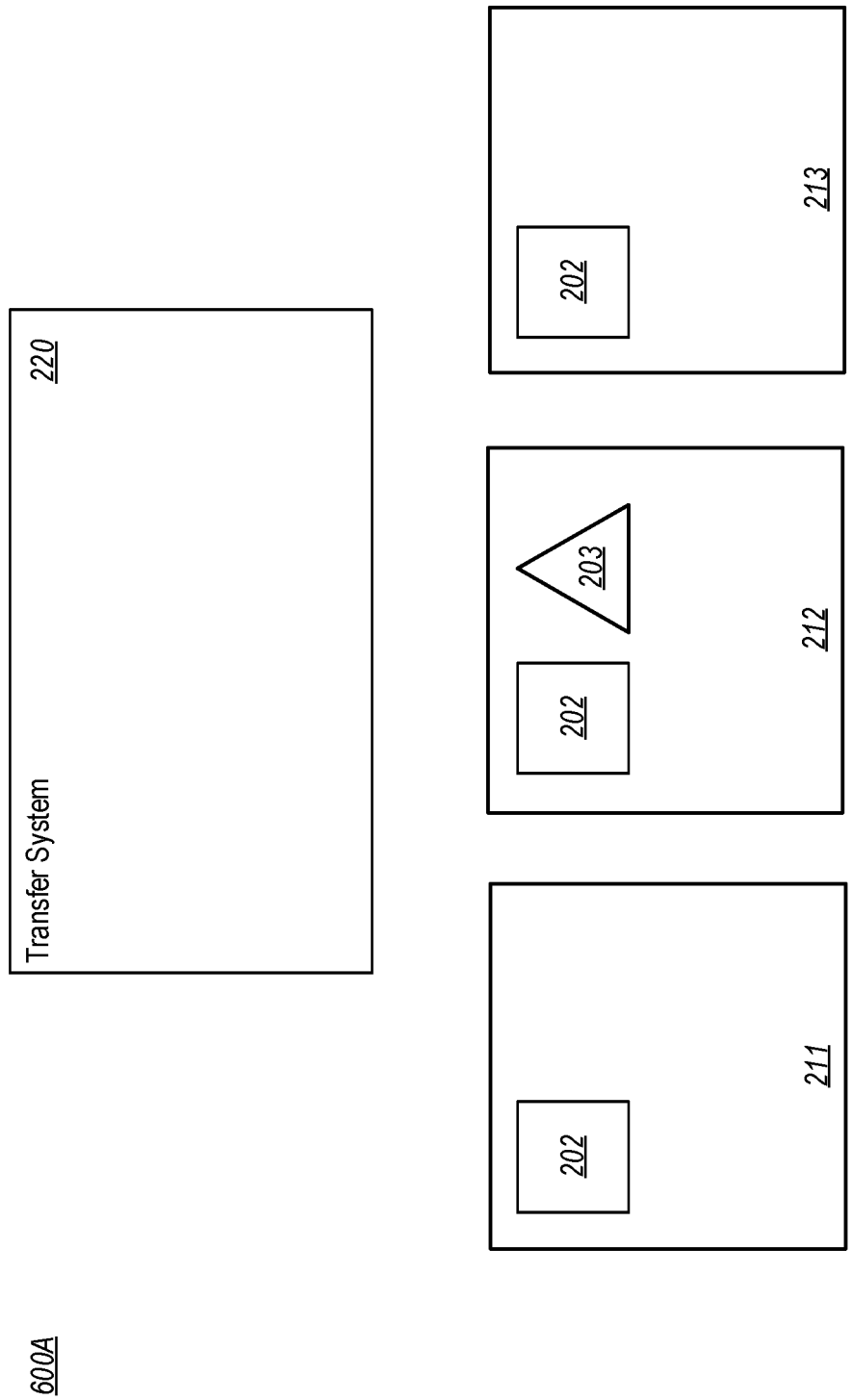

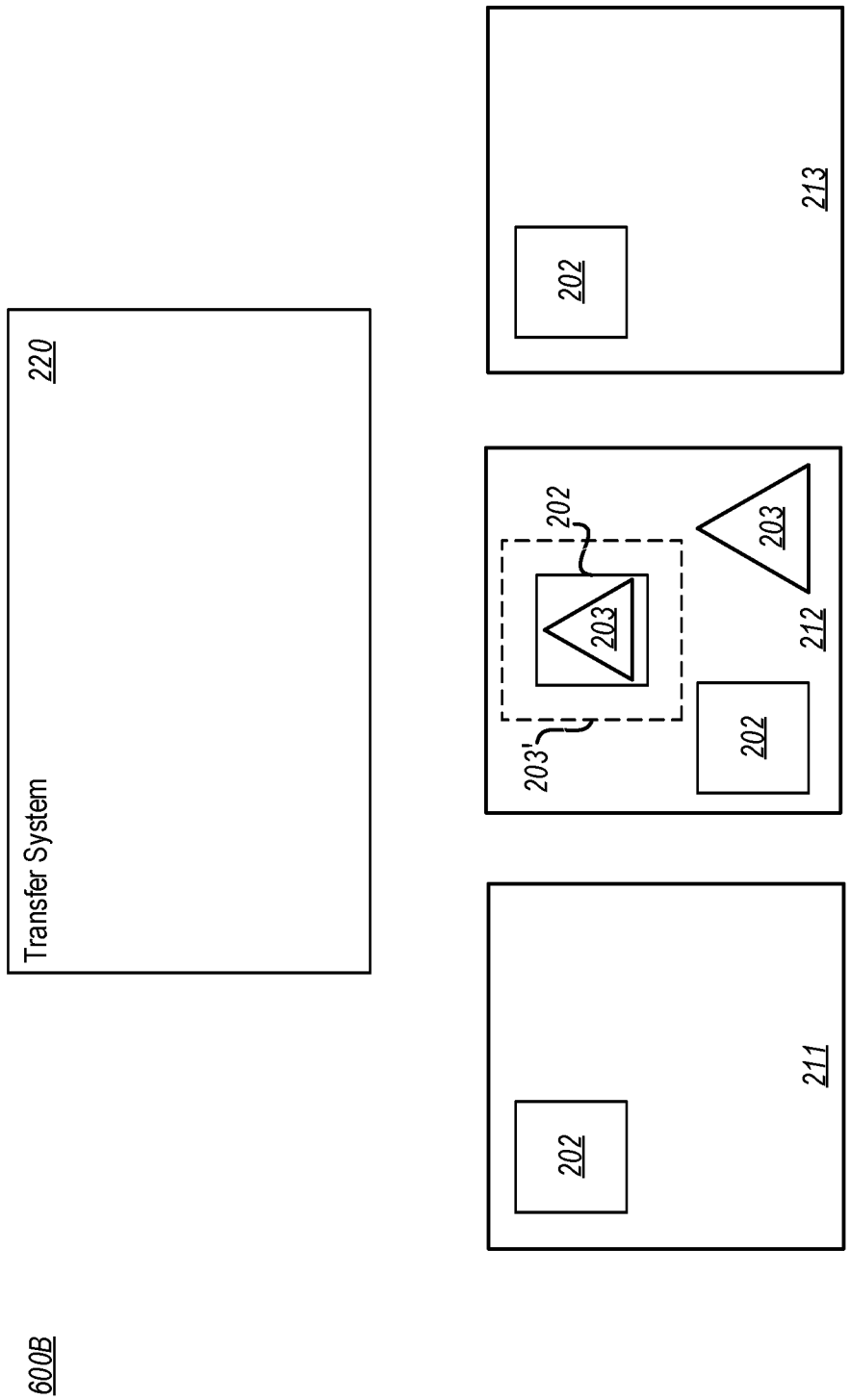

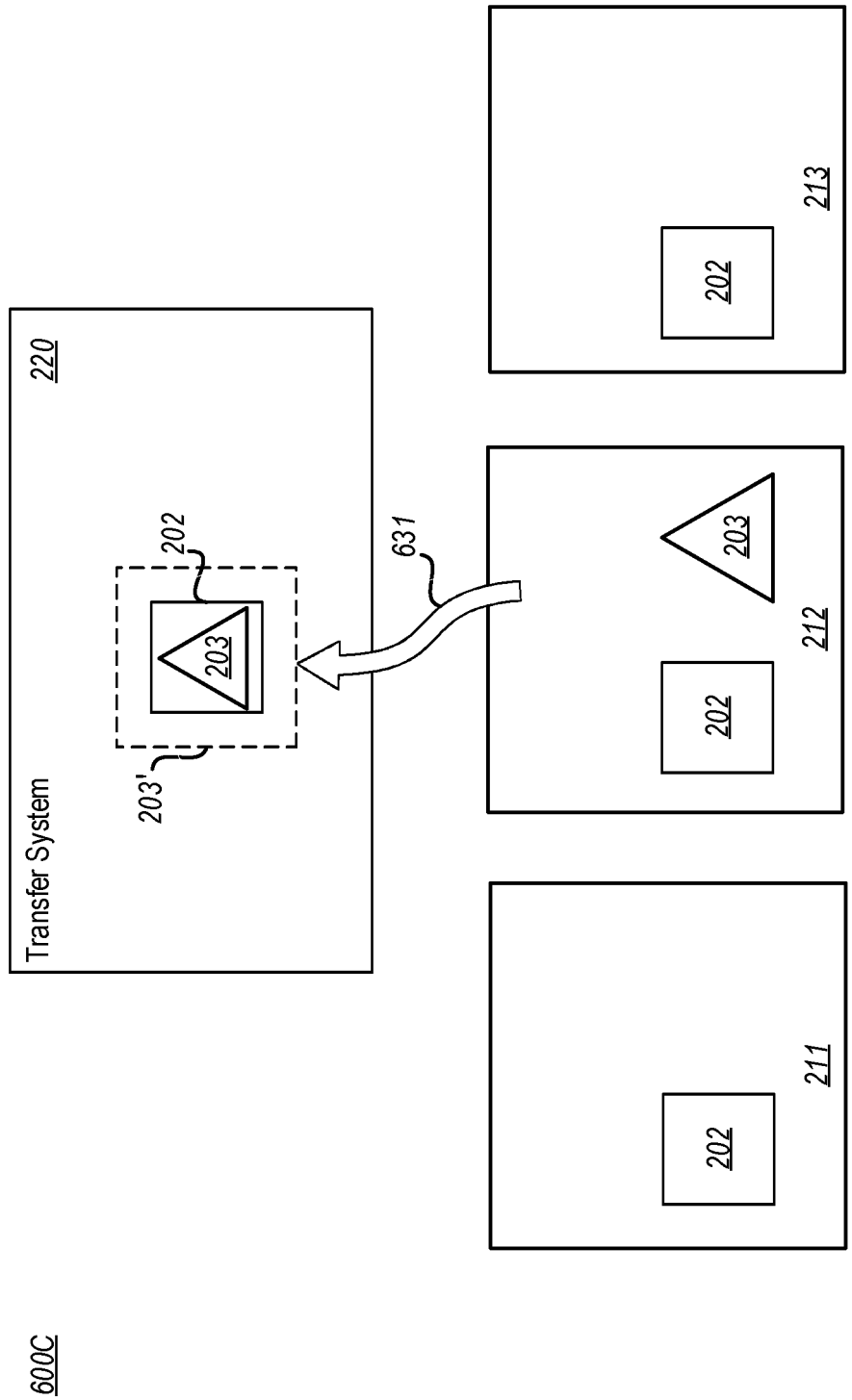

AUTOMATED CHANGEOVER OF TRANSFER ENCRYPTION KEY

BACKGROUND

Computing systems and associated networks have greatly revolutionized our world. In order to share information between computing systems over a network, that information is often first encrypted prior to transmission over the network. The recipient system may then decrypt that message to extract the original information. This allows two trusted computing systems to securely exchange information over an untrusted network while reducing the risk that the information may be discovered by other entities. The ability to encrypt and decrypt relies on both computing systems having access to a key. For instance, in asymmetric encryption, the encryption is performed using a public or private key, whereas the decryption is performed using a private key. Thus, the encryption/decryption is accomplished using a public/private key pair. In symmetric encryption, encryption and description may be accomplished using the same encryption key.

In some situations, it is advantageous for multiple computing systems to share the same key(s). This may be appropriate when the multiple computing systems are within the same sphere of trust. For instance, the computing systems may share the same public/private key pair. In order to securely communicate the appropriate key(s) over an untrusted network that is outside of the sphere of trust, a separate transfer encryption key is generated and used to encrypt the key(s) with a message. The message is then appropriately decrypted by each recipient that has the transfer encryption key. With the same public/private key pair now being present at each of the multiple computing systems, further messages may be securely transferred between the multiple computing systems.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein are related to the automated changeover of a transfer encryption key from one transfer encryption key to another amongst multiple computing systems. This occurs in an environment in which a set of computing systems are to share one or more keys (such as a private key and potentially also a public key), which may be appropriate when that computing system set is within the same sphere of trust. The transfer encryption key is used to encrypt communications of the key(s) such that the encrypted key(s) may be transferred over a transfer system without the transfer system having access to the key(s). That transfer system may be outside of the sphere of trust. The key(s) that are shared between the computing system set are to be distinguished from the transfer encryption key that is used to securely transmit the key(s) over the transfer system.

As an example only, the transfer system may be a service (such as a cloud service) that is outside of a trust boundary, whereas the set of computing systems are computing systems without the trust boundary. Nevertheless, the transfer system may keep track of the set of computing systems so that when the transfer system receives an encrypted message from one computing system in the computing system set, the transfer system passes the encrypted message to one or more of the remaining computing systems in the computing system set.

In order to perform automated changeover of the transfer encryption key, one computing system of the computing system set encrypts the next transfer encryption key with the prior transfer encryption key. The transfer system provides this encrypted message to one or more of the remaining computing systems of the computing system set. Each recipient computing system may then decrypt the encrypted message using the prior transfer encryption key, to find the next transfer encryption key. The computing system set may use the next transfer encryption key to exchange key(s) thereafter. This automated changeover may happen repeatedly to ensure that the lifetime of the current transfer encryption key is not too long to have a significantly adverse effect on security, such as a potential man-in-the middle attack, in which a computing system outside of the trust boundary is somehow able to access the content of the message in the clear. This allows the transfer system to be used to facilitate transfer of the key(s) while ensuring that the transfer system is not made aware of the key(s) in the clear.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 6A through 6F illustrate an environment that is comparable to the environment of FIG. 2, except that various stages of rolling over of a transfer encryption key are illustrated, and elements not relevant to that rolling over are not illustrated;

DETAILED DESCRIPTION

Figure 1:
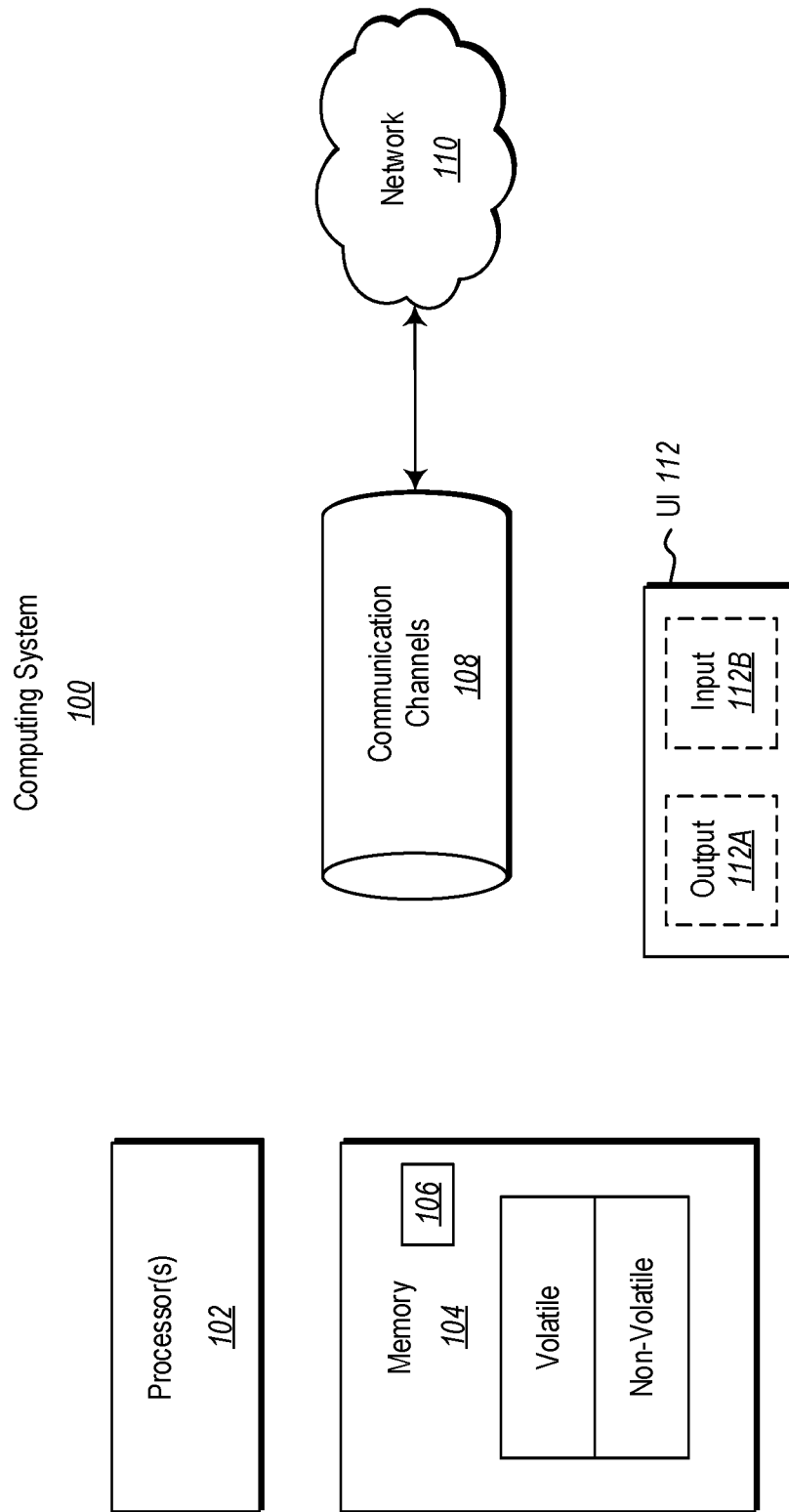
FIG. 1 illustrates an example computer system in which the principles described herein may be employed.

At least some embodiments described herein are related to the automated changeover of a transfer encryption key from one transfer encryption key to another amongst multiple computing systems. This occurs in an environment in which a set of computing systems are to share one or more keys (such as a private key and potentially also a public key), which may be appropriate when that computing system set is within the same sphere of trust. The transfer encryption key is used to encrypt communications of the key(s) such that the encrypted key(s) may be transferred over a transfer system without the transfer system having access to the key(s). That transfer system may be outside of the sphere of trust. The key(s) that are shared between the computing system set are to be distinguished from the transfer encryption key that is used to securely transmit the key(s) over the transfer system.

As an example only, the transfer system may be a service (such as a cloud service) that is outside of a trust boundary, whereas the set of computing systems are computing systems without the trust boundary. Nevertheless, the transfer system may keep track of the set of computing systems so that when the transfer system receives an encrypted message from one computing system in the computing system set, the transfer system passes the encrypted message to one or more of the remaining computing systems in the computing system set.

In order to perform automated changeover of the transfer encryption key, one computing system of the computing system set encrypts the next transfer encryption key with the prior transfer encryption key. The transfer system provides this encrypted message to one or more of the remaining computing systems of the computing system set. Each recipient computing system may then decrypt the encrypted message using the prior transfer encryption key, to find the next transfer encryption key. The computing system set may use the next transfer encryption key to exchange key(s) thereafter. This automated changeover may happen repeatedly to ensure that the lifetime of the current transfer encryption key is not too long to have a significantly adverse effect on security, such as a potential man-in-the middle attack, in which a computing system outside of the trust boundary is somehow able to access the content of the message in the clear. This allows the transfer system to be used to facilitate transfer of the key(s) while ensuring that the transfer system is not made aware of the key(s) in the clear.

Because the principles described herein operate in the context of a computing system, a computing system will be described with respect to FIG. 1. Then, the utility of a transfer encryption key will be described with respect to FIG. 2 through 4. Then, the principles of automated rollover of such a transfer encryption key will be described with respect to FIGS. 5 through 9.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
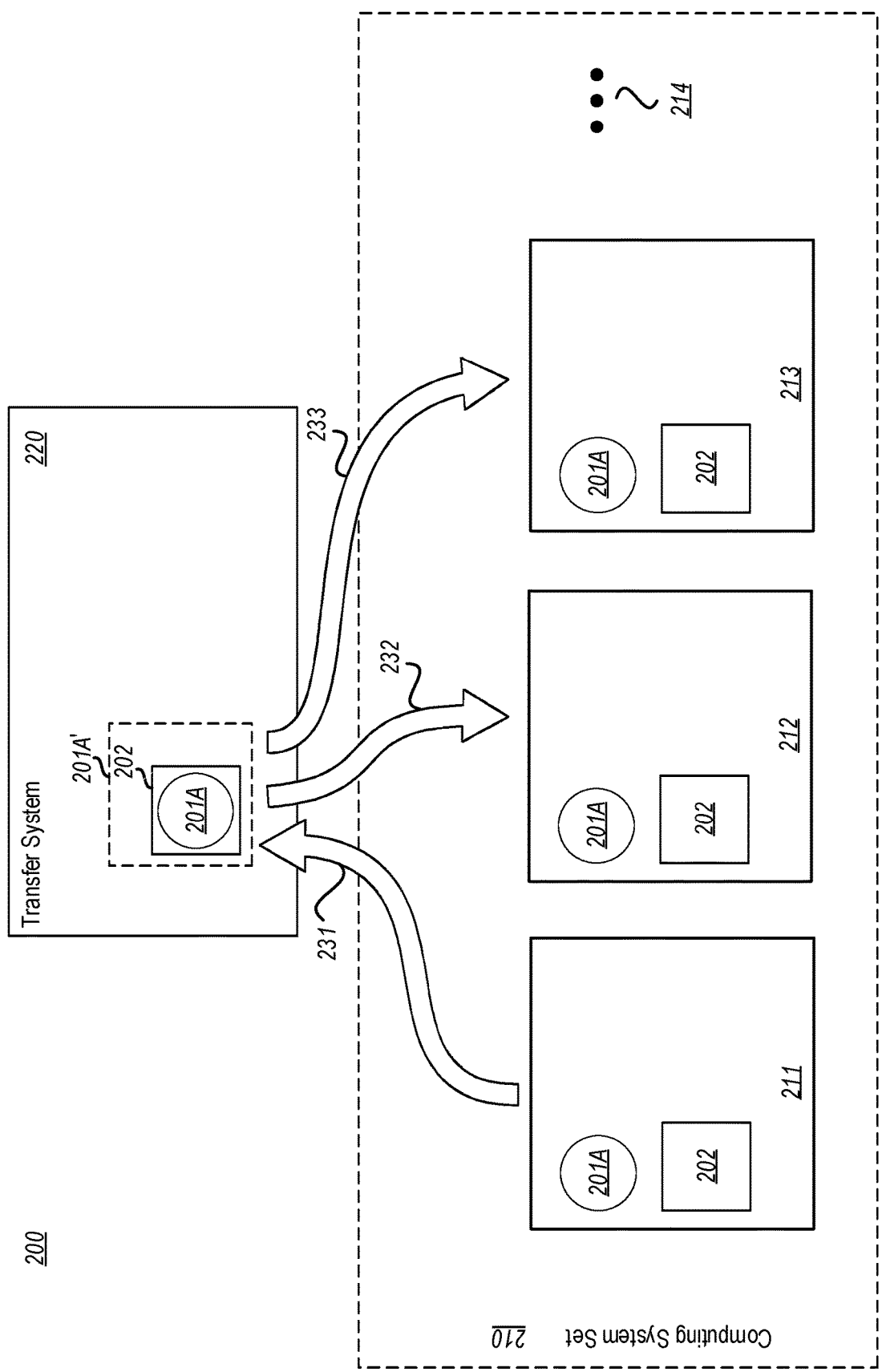
FIG. 2 illustrates an environment the includes a computing system set that is within a trust boundary, and a transfer system that is outside of the trust boundary, and in which the transfer system is used to share a common set of one or more keys including a private key amongst the computing system set.

Then, the utility of a transfer encryption key will be described with respect to FIG. 2 through 4. Thereafter, the principles of automated rollover of such a transfer encryption key will be described with respect to FIGS. 5 through 9. FIG. 2 illustrates an environment 200 that includes a transfer system 220 and a set of computing systems 210 (also called herein a "computing system set 210" or simply "computing system set"). Each of the computing systems in the computing system set 210 may be structured and operate as described above for the computing system 100 of FIG. 1. Likewise, the transfer system 220 may also be structured and operate as described above for the computing system 100 of FIG. 1. In one embodiment, the transfer system 220 operates in a cloud computing environment. For instance, the transfer system 220 may be a service that operates in the cloud computing environment.

The transfer system 220 is used to share a private key (amongst potentially other keys) between each computing system of the computing system set 210. For instance, the transfer system 220 may be used in cases in which there is no direct communication link between the computing systems of the computing system set 210. Furthermore, for security reasons, the transfer system 220 is not to have access to the unencrypted private key. In some embodiments, as described further below, the transfer system 220 also manages the computing system set 210 so that each computing system set 210 has access to a common set of keys.

The computing system set 210 is illustrated as including computing system 211, 212 and 213. Each of the computing systems 211, 212, and 213 includes a corresponding private key 201A, which is actually the same private key, and thus can be used to decrypt the same encrypted messages. The unencrypted private key 201A is symbolized as a circle in FIG. 2. Data that is not encrypted is often referred to in the art as data that is "in the clear".

Each of the computing systems 211, 212 and 213 also includes a transfer encryption key 202, which may be used to securely share the private key 201A over the transfer system 220 amongst the set of computing systems 210. This first transfer encryption key 202 is symbolized as a rectangle in FIG. 2.

To share a private key from one computing system (e.g., computing system 211) to another computing system (e.g., computing system 212) in the computing system set 210, the sharing computing system would encrypt the private key 201A using the transfer encryption key 202, and then initiate transfer of the encrypted private key 201A' to the transfer system 220 (as represented by arrow 231). A private key (represented as a circle) that is encrypted using a transfer encryption key (represented as a rectangle) is represented in FIG. 2 by a rectangle that represents the transfer encryption key encasing the circle that represents the private key. Throughout this description, different shapes will be used to represent different keys, and encryption of one key with another will be symbolized by similar encasement. For instance, encrypted private key 201A' is represented by the private key 201A appearing inside of the transfer encryption key 202 that was used to encrypted the private key 201A. The transfer system 220 can then at appropriate times (e.g., when a new computing system is joined into the set of computing systems 210), provide that encrypted private key 201A' to each of the other computing systems (e.g., as represented by arrows 232 and 233).

Again, the computing system set 210 is illustrated as including three computing system 211, 212 and 213. However, as represented by the ellipses 214, the principles described herein are not limited to the number of computing systems within the computing system set 210 that share a private key. As an example, there might be as few as one computing system in the computing system set, though the principles described herein are most helpful if there are multiple computing systems that share a common private key. This is because the principles described herein are directed to an automated mechanism for rolling over (or changing) the transfer encryption key. Conventionally, the transfer encryption key is entered into each of the computing systems 210 that are to share the private key. This is true not just for the first transfer encryption key, but for any change in transfer encryption keys as well. Thus, the automation provides the most advantage when there are a larger number of computing systems that share the private key, since such automation prevents a larger number of manual entries of the new private encryption key. Furthermore, the automation improves security since there is now no manual barrier to changeover. Thus, changeover of the transfer encryption key is likely to be more frequent, improving security by diminishing the opportunity for a man-in-the-middle security attack.

There may be any number of reasons why multiple computing systems might share a private key, and not have direct communication between those multiple computing systems. As an example, the multiple computing systems might be redundant storage systems, in which case when data is written to one of the computing systems, and at least in some cases the data is also written to another of the computing systems. To allow the data to be saved to be securely sent to each of the computing systems in the computing system set 210, the data is encrypted with a public key. When the encrypted data arrives at each of the computing systems in the computing system set 210, the respective computing system may use the private key 201A that each possesses to decrypt the data for storage.

As another example, each computing system in the computing system set 210 may render content, such as multimedia content. That multimedia content may likewise be encrypted for transmission to each computing system in the computing system set 210. Again, as the encrypted multimedia content is received, it is decrypted at each computing system of the computing system set 210 using the private key 201A present on each computing system of the computing system set 210.

In any case, the principles described herein are helpful in any circumstance in which there is a computing system set that are to share a private key. In the above two examples, each of the computing systems in the computing system set may be a listener computing system that receive encrypted data from a multicasting source computing system, and that each use the private key to decrypt the data. Other examples might be a file-sharing environment, in which at least some files that are present on one computing system in the computing system set are to be shared over a service to another computing system in the computing system set.

In some embodiments, a public key corresponding to the private key may also be communicated and shared amongst the set of computing systems 210. This may be accomplished in the same manner, and perhaps even in the same encrypted message, as the private key was shared. FIG. 3 illustrates an environment 300 that is similar to the environment 200 of FIG. 2, except that each computing system 211, 212 and 213 is illustrated as including the public key 201B corresponding to the private key 201A. Furthermore, there is an encrypted message 301 that is illustrated as including the private key 201A and the public key 201B encrypted by the transfer encryption key 202. Exchange 231 may be used by the computing system 211 to transfer this encrypted message 301 to the transfer system 220. Exchanges 232 and 233 may be used for the transfer system 220 to provide the encrypted message 301 to the computing systems 212 and 213, respectively. The exchanges 232 and 233 might occur at the same time or at different times, and may be at any time after the exchange 231.

Figure 3:
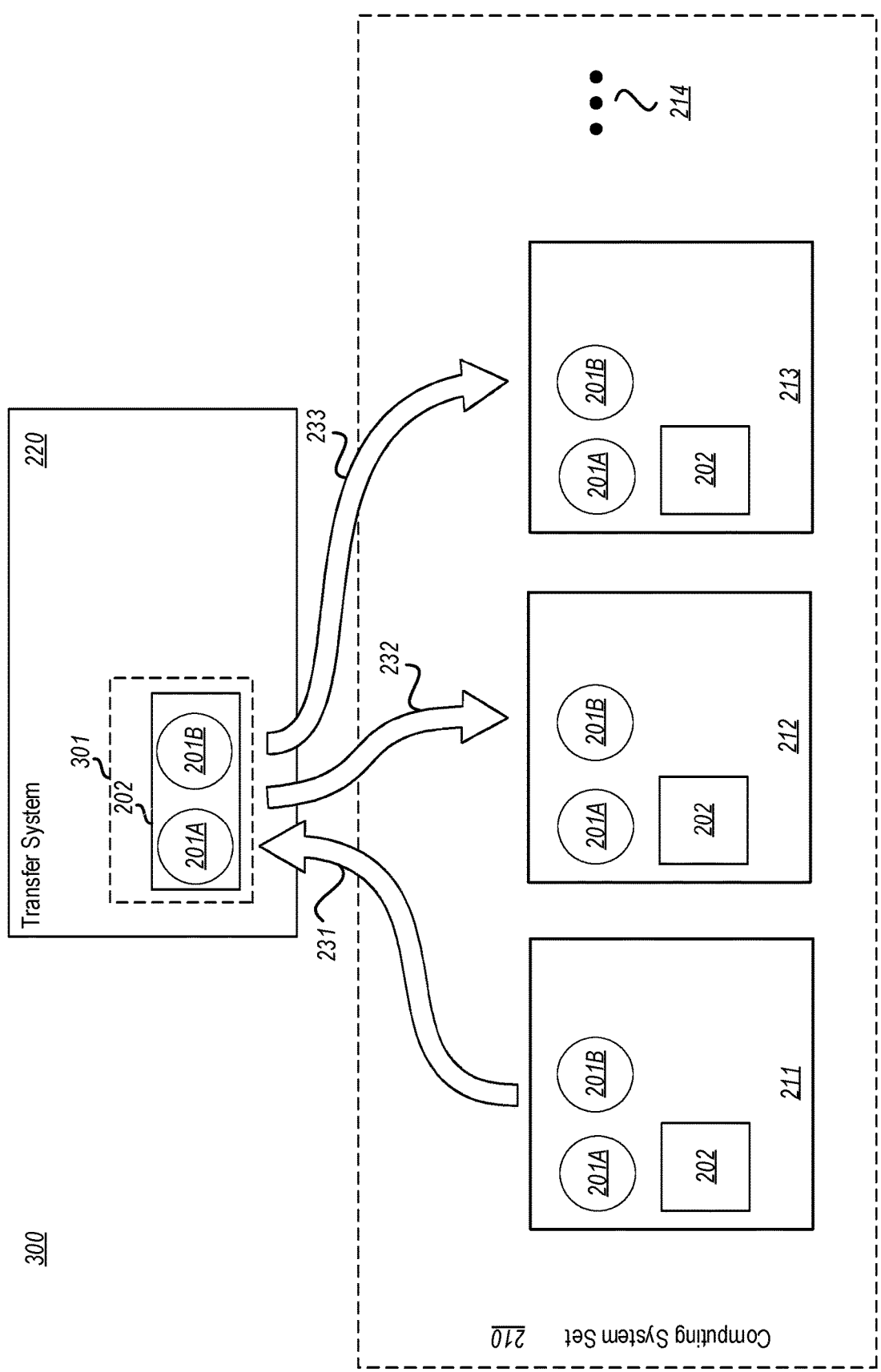
FIG. 3 illustrates an environment that is similar to the environment of FIG. 2, except that each computing system is illustrated as including the public key corresponding to the private key, where the public key is also shared in common.
Figure 4:
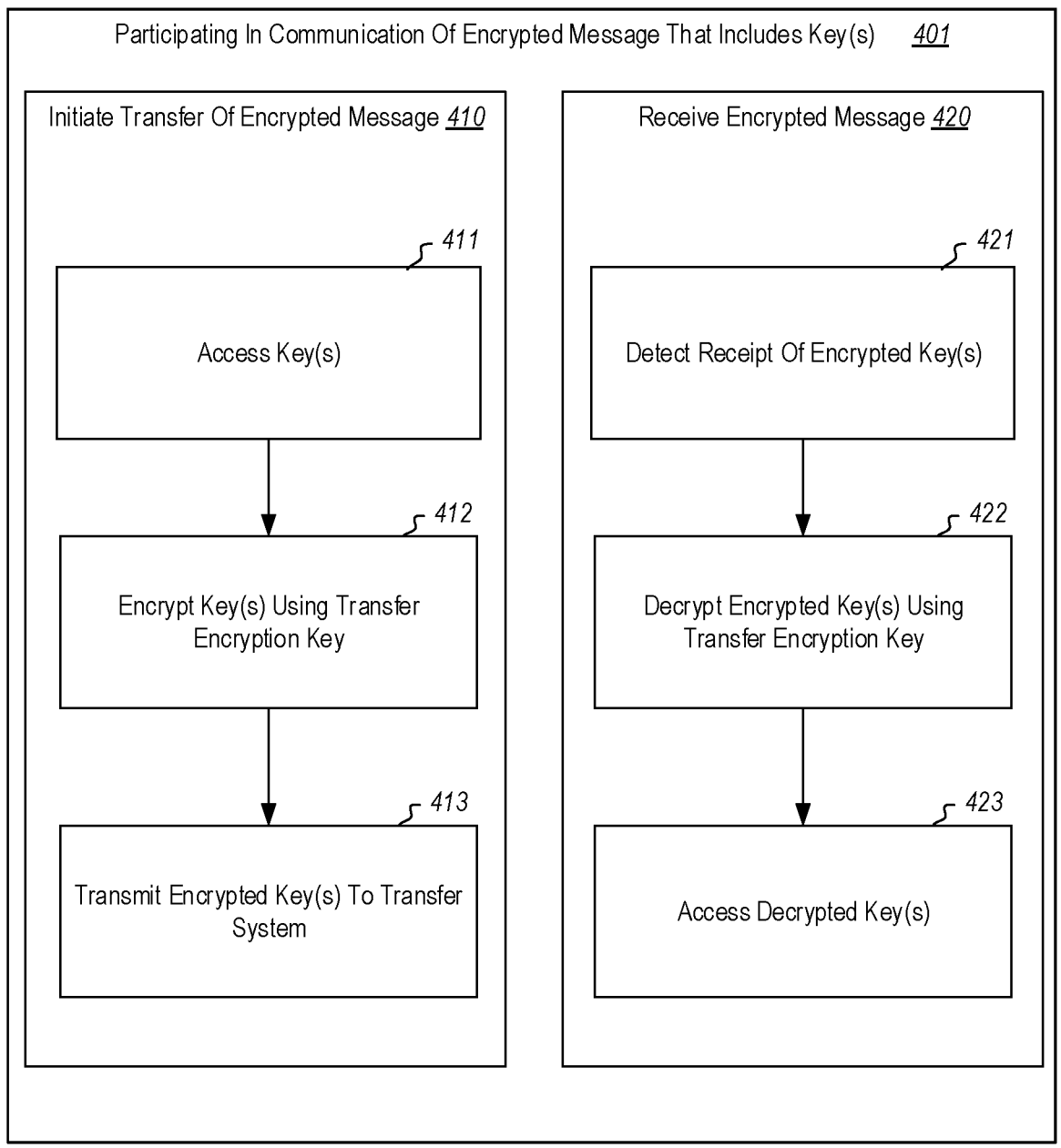
FIG. 4 illustrates a flowchart of a method for participating in secure communication of key(s) between multiple computing systems using a transfer system that does not have access to the key(s), which method may be performed in the context of FIG. 2 or FIG. 3.

FIG. 4 illustrates a flowchart of a method 400 for participating in secure communication of key(s) between multiple computing systems using a transfer system that does not have access to the key(s). As the method 400 of FIG. 4 may be performed in the environment 200 of FIG. 2, and in the environment 300 of FIG. 3, the method 400 of FIG. 4 will now be described with frequent reference to FIGS. 2 and 3.

The method 400 includes participating in communication of an encrypted message between the computing systems of the computing system set that is to share a private key (act 401). The encrypted message includes the encrypted private key as well as potentially the encrypted public key. For instance, in the context of FIG. 2, the encrypted message may be the encrypted private key 201A'. In the context of FIG. 3, the encrypted message may be the encrypted message 301.

The "participating in communication" of a message may include transmitting a message, or receiving a message. For instance, in FIG. 2, the computing system 211 is illustrated as participating in communication of the encrypted private key 201A' by initiating transfer of the encrypted private key 201A' (as represented by the arrow 231 in FIG. 2, and act 410 in FIG. 4). In FIG. 3, the computing system 211 is illustrated as participating in communication of the encrypted message 301 by initiating transfer of the encrypted message 301 (as represented by the arrow 231 in FIG. 3, and act 410 in FIG. 4). This initiation of transfer (act 410) may include accessing the appropriate key(s) (act 411), encrypting the appropriate key(s) using the transfer encryption key (act 412), and transmitting the encrypted key(s) to the transfer system (act 413).

As represented by arrows 232 and 233 in FIG. 2, the computing system 212 and 213, respectively, are illustrated as participating in communication of the encrypted private key 201A' by receiving the encrypted private key 201A' (act 420). As represented by arrows 232 and 233 in FIG. 3, the computing system 212 and 213, respectively, are illustrated as participating in communication of the encrypted message 301 by receiving the encrypted message 301 (also act 420). This receipt of the encrypted message (act 420) includes detecting receipt of the encrypted key(s) (act 421), decrypting the encrypted key(s) using the transfer encryption key (act 422), and accessing the decrypted key(s) (act 423).

Specifically, one of the computing system in the computing system set 210 (hereinafter called the "initiating computing system") is tasked with initiating the rolling over of the transfer encryption key when that initiating computing system accesses a new transfer encryption key (act 501). This may happen when a user enters the new transfer encryption key (or a new transfer key is automatically generated) at one of the computing systems in the computing system set 210 (e.g., say computing system 212 in an example herein). After entering that new transfer encryption key into one of the computing systems, however, there is no need for further manual entry. In some embodiments, automated intelligence may generate and enter the new manual transfer key in the initiating computing system to thereby automatically initiate the process, and enabling fully automated changeover of the transfer encryption key.

Figure 5:
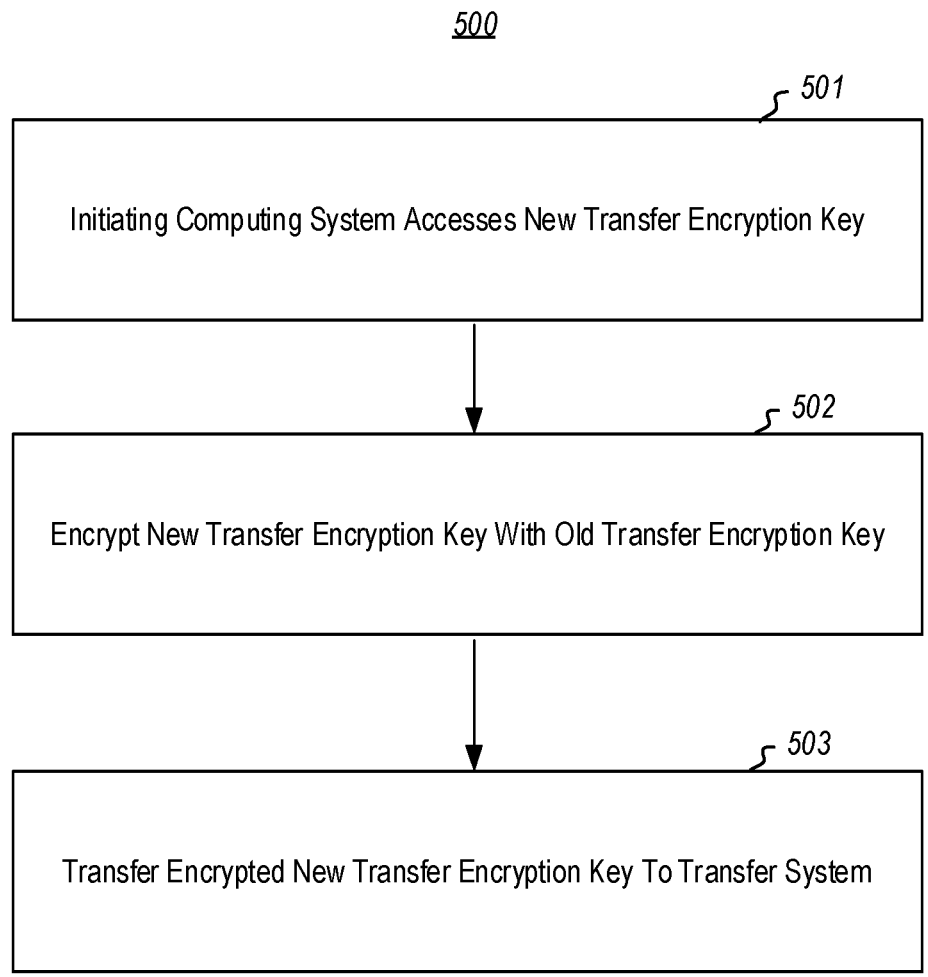
FIG. 5 illustrates a flowchart of a method for initiating a secure rollover of the transfer encryption key in accordance with the principles described herein.

FIG. 5 illustrates a flowchart of a method 500 for initiating a secure rollover of the transfer encryption key in accordance with the principles described herein. For security purposes, it is advantageous for a transfer encryption key not to have too long of a lifetime. For instance, regular rollover or changeover of the transfer encryption key mitigates the risk that the transfer encryption key will be discovered during its lifetime, which discovery would enable a man-in-the-middle attack, with the private key itself being discovered outside of the trust boundary. Thus, the transfer encryption key is rolled over every so often. Traditionally, this is accomplished by manually entering the new transfer encryption key at each computing system in the set of computing systems 210. However, in accordance with the principles described herein, this rolling over is accomplished automatically.

Specifically, one of the computing system in the computing system set 210 (hereinafter called the "initiating computing system") is tasked within initiating the rolling over of the transfer encryption key when that initiating computing system accesses a new transfer encryption key (act 501). This may happen when a user enters the new transfer encryption key (or a new transfer key is automatically generated) at one of the computing systems in the computing system set 210 (e.g., say computing system 212 in an example herein). After entering that new transfer encryption key into one of the computing systems, however, there is no need for further manual entry. In some embodiments, automated intelligence may generate and enter the new manual transfer key in the initiating computing system to thereby automatically initiate the process, and enabling fully automated changeover of the transfer encryption key.

Figure 6D:
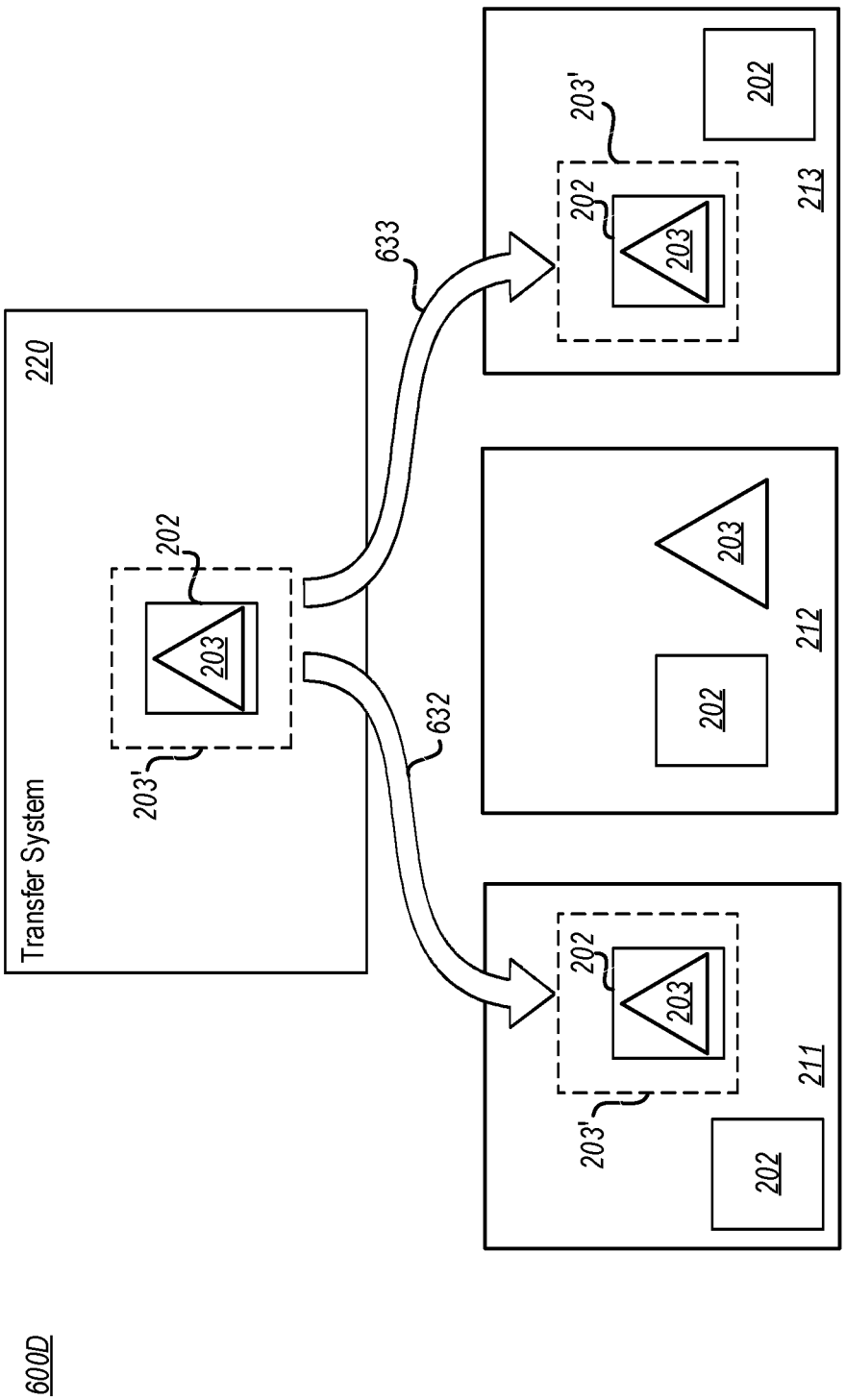

FIG. 6A illustrates an environment in a first state 600A, which is similar to the environment 200 of FIG. 2 and the environment 300 of FIG. 3, except that there is a new transfer encryption key 203 is shown as present at the computing system 212. FIG. 6A further differs from FIG. 2 in that the private key 201A and encrypted private key 201A' are no longer illustrated though it will be understood that each computing system 211, 212 and 213 continues to possess the private key 201A, and the encrypted private key 201A' could continue to remain on the transfer system 220. FIG. 6A further differs from FIG. 3 in that neither the private key 201A nor the public key 201B are illustrated though it will be understood that each computing system 211, 212 and 213 continues to possess the private key 201A and the public key 201B. Also, the encrypted message 301 is not shown though it will be understood that the encrypted message 301 could continue to remain on the transfer system 220. Furthermore, the arrows 231, 232 and 233 are no longer visible as they were associated with the prior sharing of the private key 201A and, in the case of FIG. 3, the public key 201B, and FIGS. 6A through 6F are to illustrate what happens after that. Lastly, to keep FIG. 6A simpler, the boundary 210 is not illustrated and the ellipses 214 are removed.

The initiating computing system then encrypts the new transfer encryption key using the old transfer encryption key (act 502). FIG. 6B illustrates the environment of FIG. 6A in a subsequent state 600B in which the initiating computing system 212 has encrypted transfer encryption key 203 with the old transfer encryption key 202. The encrypted transfer encryption key 203' is represented by triangle that represents the new transfer encryption key 203 being encased by the rectangle that represents the old transfer encryption key 202. In one embodiment, the encrypted message 203' is also encrypted to include a new private key, and potentially also a new corresponding public key. This further improves the security of the system as a whole.

The initiating computing system then initiates transfer of the encrypted transfer encryption key 203' over the transfer system (act 503). FIG. 6C illustrates the environment of FIG. 6B in a subsequent state 600C in which the initiating computing system 212 has transferred (as represented by arrow 631) the encrypted transfer encryption key 203' to the transfer system 220.

Upon receiving the encrypted transfer encryption key 203', the transfer system 220 transmits the encrypted transfer encryption key 203' to the remainder of the computing systems in the computing system set 210. The transfer system 220 keeps track of membership of the computing system set 210 so that it knows where to propagate the encrypted transfer encryption key 203' to. The transfer system 220 may ensure reliable delivery of the encrypted transfer key 203' by confirming that each computing system in the computing system set 210 received (and potentially also decrypted and applied) the new transfer encryption key 203. The transfer system 220 also potentially keeps the encrypted transfer encrypted key 203'.

Figure 6E:
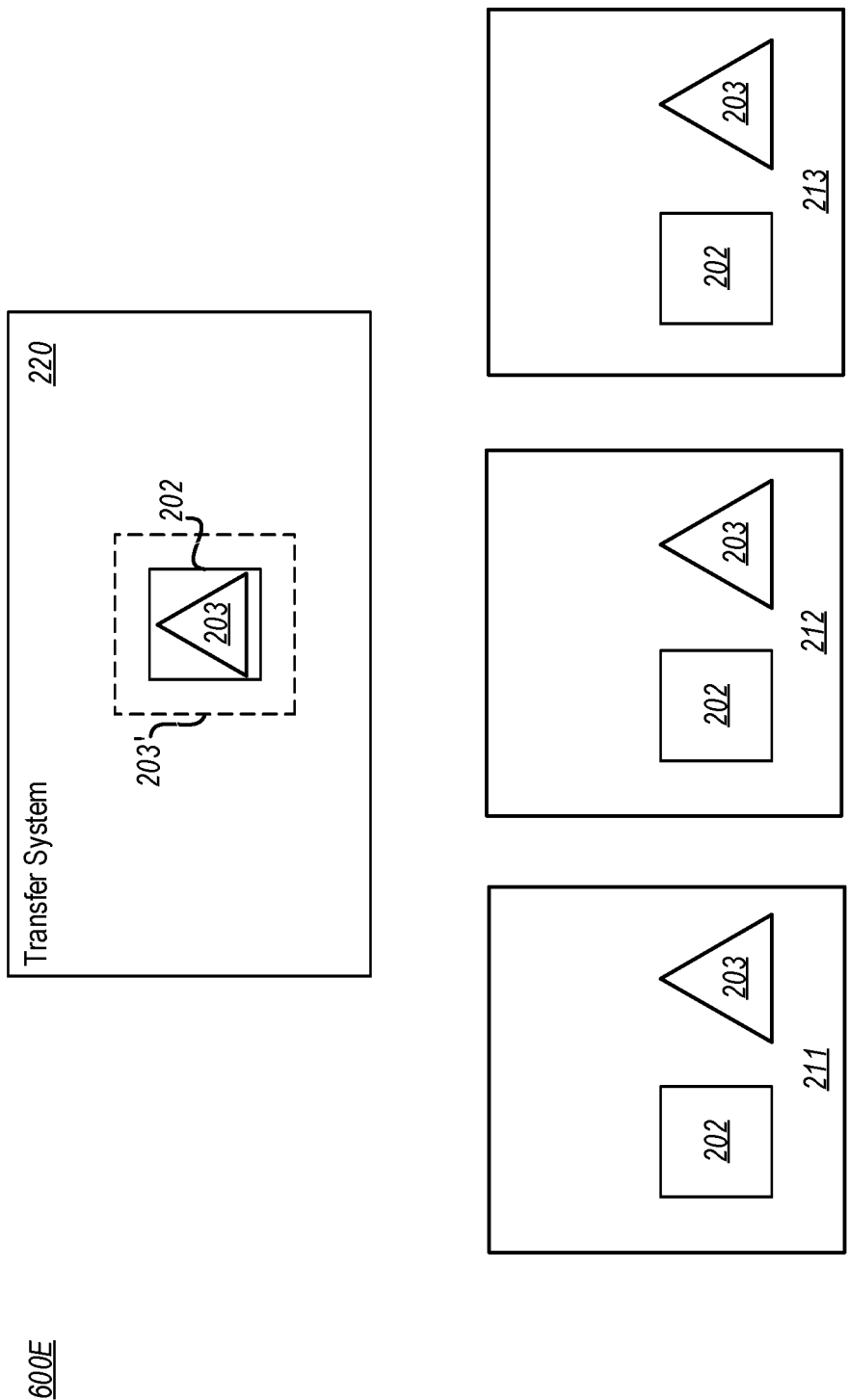
Figure 6F:
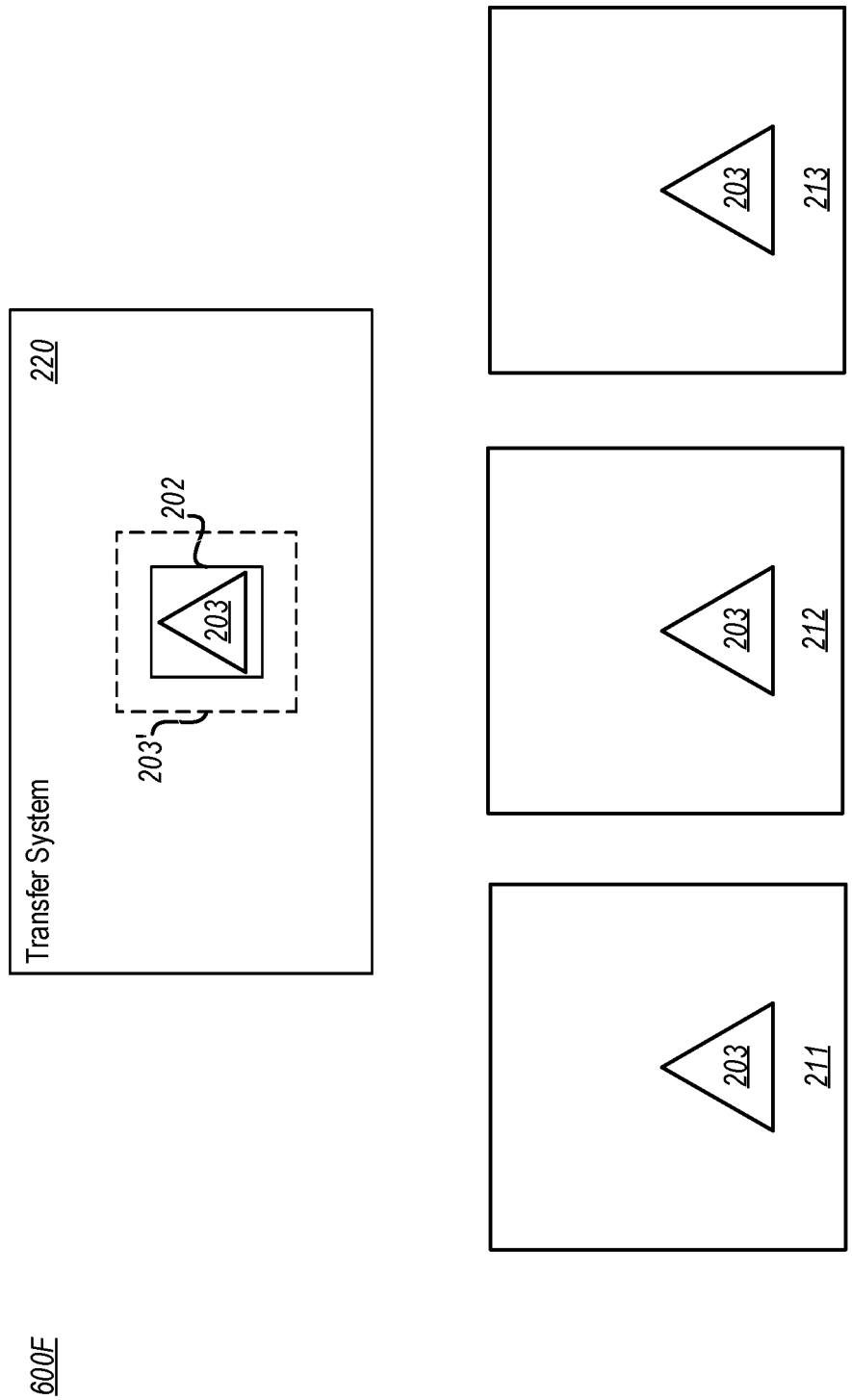
Figure 7:
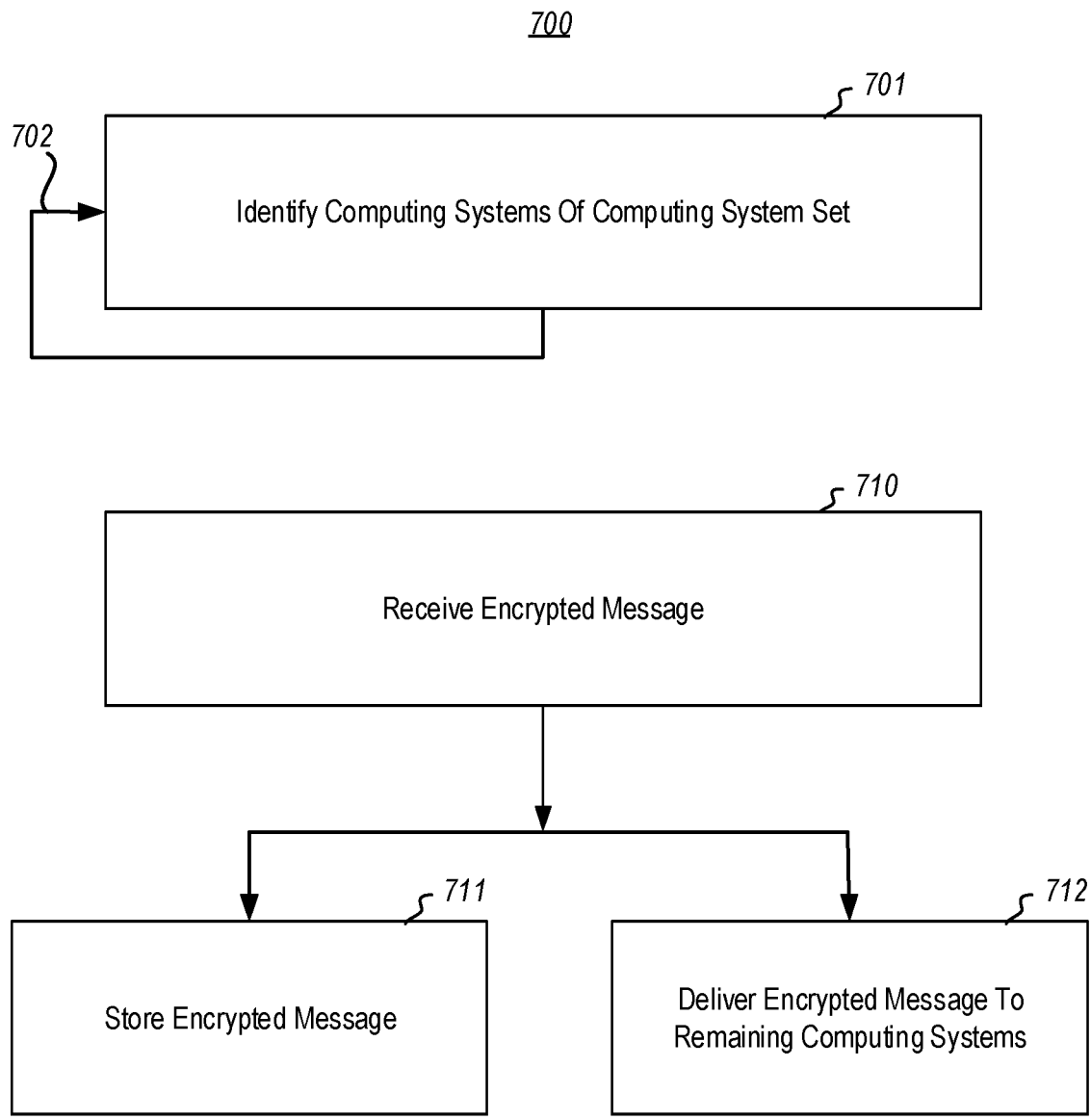
FIG. 7 illustrates a flowchart of a method for the transfer system to intermediate and manage the sharing of a set of keys amongst the computing system set.

The remaining states 600D, 600E and 600F of FIGS. 6D, 6E and 6F will be described after describing FIG. 7, which illustrates a flowchart of a method 700 for the transfer system to intermediate and manage the sharing of a set of keys amongst the computing system set. First, the transfer system identifies the computing systems in the computing system set (act 701). For instance, in the context of FIGS. 2 and 3, the transfer system 220 keeps track of membership in the computing system set 210. As represented by arrow 702, this identification is continuously performed such that the membership is kept track up. As a new computing system joins the computing system set 210, the transfer system 220 registers that new computing system as being a member of the computing system set 210. As a computing system is removed from the computing system set 210, the transfer system 220 removes that computing system from the computing system set 210.

Furthermore, as potentially a separate process from maintaining this membership, when the transfer system receives any encrypted message from a computing system in the computing system set (act 710), the transfer system potentially stores that encrypted message (act 711) as well as delivering the encrypted message to one or more of the remaining computing systems in the computing system set (act 712). Storage may especially occur when the encrypted message includes another encryption key, as when rollover of the transfer encryption key is occurring. This process may be repeated regardless of which computing system acts as the initiating computing system in the transfer encryption key rollover process. For instance, in one rollover of the transfer encryption key, the computing system 211 may act as the initiating computing system. In a next rollover of the transfer encryption key, the computing system 212 may act as the initiating computing system.

FIG. 6D illustrates the environment of FIG. 6C in a subsequent state 600D in which the transfer system transferred (as represented by arrow 632 and 633) the encrypted new transfer encryption key 203' to each of the other computing systems 211 and 213 in the computing system set 210. Each of the computing systems 211 and 213 is shown as having received the encrypted transfer encryption key 203'.

Figure 8:
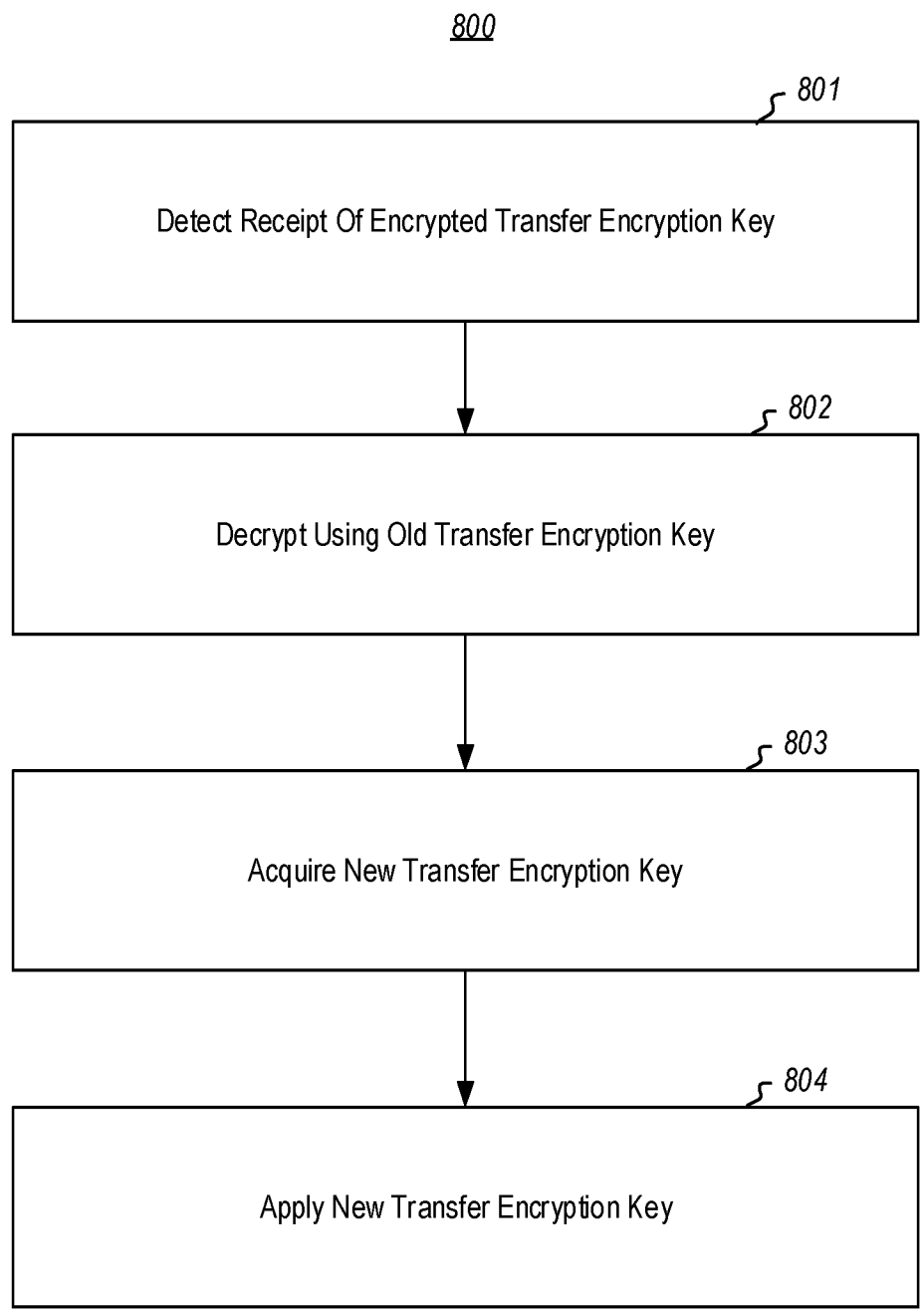
FIG. 8 illustrates a flowchart of a method for responding to the receipt of the encrypted transfer encryption key to thereby complete rollover of the transfer encryption key.

FIG. 8 illustrates a flowchart of a method 800 for responding to the receipt of the encrypted transfer encryption key 203'. The first act is detecting receipt of the encrypted message 203' (act 801). In FIG. 6D, the computing systems 211 and 213 have detected receipt of the encrypted transfer encryption key 203'. At this point, the computing systems 211 and 213 might not actually know the content of the message, but simply understand that they now must decrypt the message using the transfer encryption key 202 that they already have.

Then, the recipient computing system decrypts the encrypted transfer encryption key using the old transfer encryption key (act 802). This allows the recipient computing system to acquire the new transfer encryption key (act 803). FIG. 6E illustrates the environment of FIG. 6D in a subsequent state 600E in which the recipient computing systems 211 and 213 have each decrypted the encrypted transfer encryption key 203' using the old transfer encryption key 202 (act 802), to thereby acquire the new transfer encryption key 203. The new transfer encryption key 203 may then be applied (act 804), which allows the old transfer encryption key to be discarded or ignored from that time forth. Accordingly, FIG. 6F illustrates the environment of FIG. 6E is a subsequent state 600F in which the computing systems 211, 212, and 213 are illustrated as having and applying the new transfer encryption key 203, and with there being no old transfer encryption key 202 having not been removed or rendered irrelevant.

Accordingly, the principles described herein allow for automated rollover of transfer encryption keys. Furthermore, it permits a computing system that was offline or newly joined into the computing system set to become caught up to the current transfer encryption key.

Figure 9:
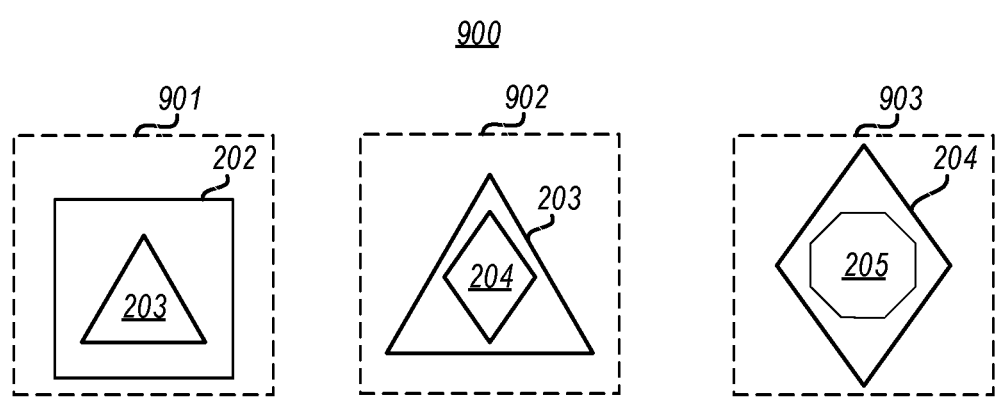
FIG. 9 illustrates various encrypted message that may be stored by the transfer system to help a computing system get caught up with the most current transfer encryption key.

For instance, suppose that there have been three rollovers of transfer encryption key. FIG. 9 illustrates the encrypted messages 901, 902 and 903 that could be stored by the transfer system. The encrypted message 901 is an encryption of the second transfer encryption key 203 (represented as a triangle) using the very first transfer encryption key 203 (represented as a rectangle), and is stored by the transfer system at the first rollover of the transfer encryption key. The encrypted message 902 is an encryption of the third transfer encryption key 204 (represented as a rhombus) using the second transfer encryption key 203 (again represented as a triangle), and is stored by the transfer system at the second rollover of the transfer encryption key. The encrypted message 903 is an encryption of the current transfer encryption key 205 (represented as an octagon) using the third transfer encryption key 204 (again represented as a rhombus), and is stored by the transfer system at the third and final rollover of the transfer encryption key.

Through cooperation with the transfer system, a computing system that has only the first transfer encryption key can get caught up to acquire the current transfer encryption key. The computing system could acquire the encrypted message 901 from the transfer system, decrypt that encrypted message using the very first transfer encryption key 201 to thereby acquire the second transfer encryption key 202. The computing system could then acquire the encrypted message 902 from the transfer system, decrypt that encrypted message using the second transfer encryption key 202 to thereby acquire the third transfer encryption key 203. Finally, the computing system could acquire the encrypted message 903 from the transfer system, decrypt that encrypted message using the third transfer encryption key 203 to thereby acquire the current transfer encryption key 203.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having stored thereon computer-executable instructions that are executable by the one or more processors to configure the computing system to participate in secure communication of at least one private key between multiple computing systems using a transfer system that does not have access to the at least one private key, and by at least configuring the computing system to perform the following:
      participate in communication of a first encrypted message between a first plurality of computing systems over a transfer system, the first encrypted message comprising an encrypted private key that is encrypted using a first transfer encryption key, the transfer system not having access to the private key;
      after participating in communication of the first encrypted message, encrypt a second encrypted message using the first transfer encrypted key, the second encrypted message comprising a second transfer encryption key encrypted by the first transfer encryption key;
      initiate transfer of the second encrypted message over the transfer system to at least one other computing system; and
      receive a third encrypted message over the transfer system from one of the first plurality of computing systems that is encrypted with the second transfer encryption key and that includes at least one of a new transfer encryption key or a new private key that is provided to each of the plurality of computing systems.

2. The computing system in accordance with claim 1, the multiple computing systems being listener computing systems that receive encrypted data from a multicast source computing system, and that each use the private key to decrypt the data.

3. The computing system in accordance with claim 2, the data including files to be stored.

4. The computing system in accordance with claim 2, the data including multimedia data.

5. The computing system in accordance with claim 1, the multiple computing systems comprising redundant storage systems.

6. The computing system in accordance with claim 1, the multiple computing systems comprising file sharing computing systems.

7. The computing system in accordance with claim 1, the first encrypted message also comprising a public key corresponding to the private key.

8. The computing system in accordance with claim 7, the private key being a first private key, the public key being a first public key the second encrypted message also comprising a second private key and a corresponding second public key.

9. The computing system in accordance with claim 1, the participating in communication of a first encrypted message between a first plurality of computing systems over the transfer system comprising: initiating transfer of the first encrypted message over the transfer system.

10. The computing system in accordance with claim 1, the participating in communication of a first encrypted message between a first plurality of computing systems over the transfer system comprising: detecting receipt of the first encrypted message from the transfer system.

11. A computing system comprising:
    one or more processors; and
    one or more computer-readable hardware storage devices having stored thereon computer-executable instructions that are executable by the one or more processors to configure the computing system to participate in secure communication of at least one private key between multiple computing systems using a transfer system that does not have access to the at least one private key, and by at least configuring the computing system to perform the following:
       participate in communication of a first encrypted message between a first plurality of computing systems over the transfer system, the first encrypted message comprising an encrypted private key that is encrypted using a first transfer encryption key and that is provided to each of the first plurality of computing systems;
       after participating in communication of the first encrypted message, and in response to detecting receipt of a second encrypted message from the transfer system, decrypt the encrypted second message using the first transfer encryption key to obtain a second transfer encryption key; and
       after receiving the second encrypted message, participate in communication of a third encrypted message to at least one of the first plurality of computing systems over the transfer system, by at least generating the third encrypted message that is encrypted by the computing system using the second transfer encryption key and that includes at least one of a new encrypted private key encrypted by the second transfer encryption key or new encrypted transfer encryption key that is encrypted by the second transfer encryption key.

12. The computing system in accordance with claim 11, the participating in communication of a first encrypted message between a first plurality of computing systems over the transfer system comprising: initiating transfer of the first encrypted message over the transfer system.

13. The computing system in accordance with claim 11, the participating in communication of a first encrypted message between a first plurality of computing systems over the transfer system comprising: detecting receipt of the first encrypted message from the transfer system.

14. The computing system in accordance with claim 11, the participating in communication of a third encrypted message between a second plurality of computing systems over the transfer system comprising:
detecting receipt of the third encrypted message from the transfer system.

15. The computing system in accordance with claim 11, the participating in communication of a third encrypted message between a second plurality of computing systems over the transfer system comprising:
initiating transfer of the third encrypted message over the transfer system.

16. A computing system comprising:
one or more processors; and
one or more computer-readable hardware storage devices having stored thereon computer-executable instructions that are executable by the one or more processors to configure the computing system to participate in secure communication of at least one private key between multiple computing systems and by at least configuring the computing system to perform the following:
identify a set of computing systems that are to be provided with a key changeover service;
receive a first encrypted message from a first computing system of the set of computing systems, the first encrypted message comprising an encrypted private key that is encrypted using a first transfer encryption key, the transfer system not having access to the private key or the first transfer encryption key;
provide the first encrypted message to a first remainder of the set of computing systems;
detect a new computing system joining the set of computing systems;
provide the new computing system the first encrypted message in response to the new computing system joining the set of computing systems
receiving a second encrypted message from a second computing system of the set of computing systems, the second encrypted message comprising a second transfer encryption key encrypted with the first transfer encryption key; and
providing the first encrypted message to a second remainder of the set of computing systems.

17. The computing system in accordance with claim 16, the first and second computing systems of the set of computing systems being the same computing system.

18. The computing system in accordance with claim 16, the set of computing systems being listener computing systems that receive encrypted data from a multicast source computing system, and that each use the private key to decrypt the data.

19. The computing system in accordance with claim 16, the set of computing systems comprising redundant storage systems.

20. The computing system in accordance with claim 16, wherein the new computing system has previously received the first transfer encryption key and uses the first transfer encryption key to decrypt the first encrypted message.

\* \* \* \* \*